UNITED STATES PATENT OFFICE.

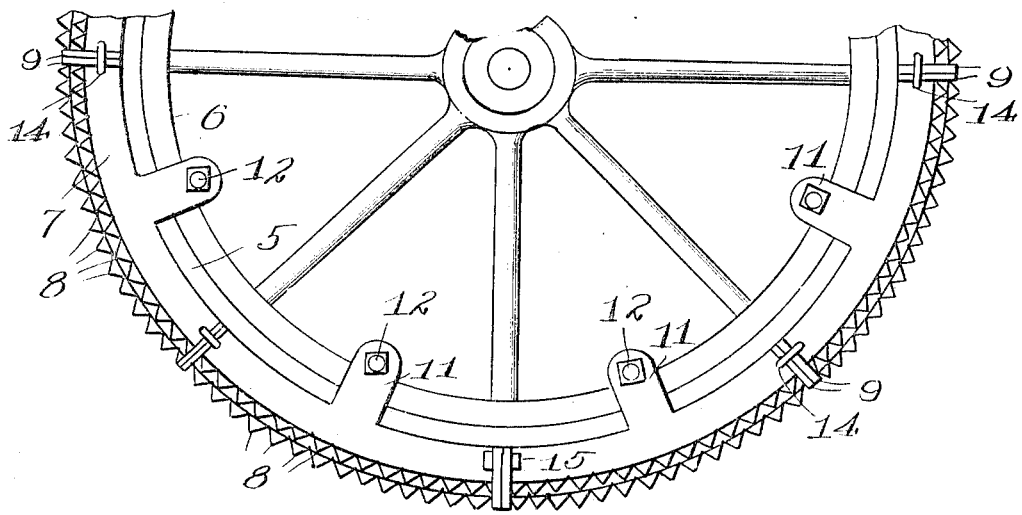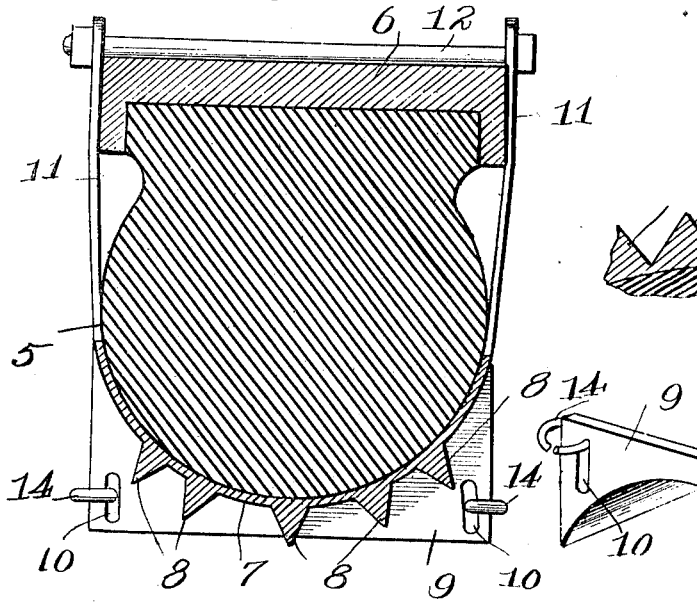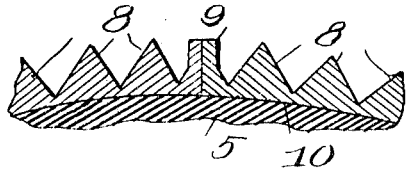

EUGENE JENÖI AND STEVE KRUCHIÓ, OF UNIONTOWN, PENNSYLVANIA, ASSIGNORS OF TWENTY-FIVE ONE-HUNDREDTHS TO GREGOR R. SZÜCS AND OF TWENTY-FIVE ONE-HUNDREDTHS TO ANTHONY KRUCHIO, BOTH OF UNIONTOWN, PENNSYLVANIA.

ANTISKID DEVICE.

1,107,796.  Specification of Letters Patent.   Patented Aug. 18, 1914.

Application filed February 14, 1914.  Serial No. 818,667.

*To all whom it may concern:*

Be it known that we, EUGENE JENÖI and STEVE KRUCHIÓ, subjects of the King of Hungary, residing at Uniontown, in the county of Fayette and State of Pennsylvania, have invented certain new and useful Improvements in Antiskid Devices, of which the following is a specification.

This invention relates to certain new and useful improvements in anti-skid devices for automobiles and like vehicles, and has for its object, the provision of novel and effective means for preventing the skidding or lateral movement of wheels on slippery surfaces.

The invention while adapted to pneumatic tired or other type of wheels, is particularly adapted for use in connection with wheels having what are generally known as cushion tires, and among its objects, aims to provide for such wheels an anti-slipping armor which may be readily attached to or applied to the tire, securely fastened to the wheel, and as readily removed when desired.

The invention has for its further object to provide an armor for pneumatic or cushion tires built up of similar or counterpart sections having a novel joining means which will permit of the required flexibility of the armor and also permit of the movement of one section with respect to an adjoining section or adjoining sections without danger of breaking or damaging the connection between the sections.

Other objects of the invention will appear as the invention is hereinafter more fully described and claimed, and in describing the invention in detail, reference will be had to the accompanying drawings forming a part of this specification, and wherein like numerals of reference indicate like parts throughout the different views, in which:—

Figure 1 is a view in side elevation of a cushion tired wheel, partly broken away, with an armor constructed in accordance with our invention applied thereto. Fig. 2 is an enlarged cross-sectional view of the same. Fig. 3 is a partial longitudinal sectional view showing the meeting ends of two of the sections of the armor, and, Fig. 4 is a detached detail perspective view of a part of one of the armor sections.

In the illustrated embodiment of our invention, we have shown an armor constructed in accordance with our invention as applied to a wheel having a cushion tire, 5 designating the cushion tire secured to the felly 6 of the wheel in any desired or approved manner.

An armor in accordance with our invention is preferably made in a series of sections. These may be as many or as few in number as desired, though we have found it advantageous to build up the armor of quite a number of sections, substantially as many as there are spokes in the wheel, as this provides for a greater flexibility of the armor.

The sections of the armor are duplicates one of the other, each being formed on the arc of a circle, so that they will fit with the tire to which they are applied. These sections are preferably formed of metal, and while they may be stamped out, they are preferably cast, and each section comprises a plate member 7 that is curved both longitudinally and transversely, the arc transversely of the plate being of course, considerably greater than the longitudinal arc, that the plate may neatly fit with the periphery of the tire to which it is applied. The convex or outer face of this plate is provided with pointed projections 8, which may have any desired contour, but desirably of pyramidal contour as herein shown, and which are arranged preferably in rows on the outer face of the plate and extending longitudinally of the plate, the preferable arrangement of these rows being one in the central longitudinal line of the plate, and one or more, preferably at least two rows on each side of the central row, the two rows which lie adjacent the central longitudinal row being spaced some distance farther from said central row than the remaining rows are spaced from each other, as best seen in Fig. 2 of the drawings. At each end of each section is an outwardly extending end plate or flange 9, provided near each side with an oblong slot 10, and substantially midway between the ends of each section, the plate 7 has inwardly-projecting side arms 11, that are sufficiently long to project inward beyond the felly, and have apertures in their inner ends to receive a cross-bolt 12 by means of which the sections are fastened securely onto the wheel. The sections are flexibly or loosely joined together by means of rings 14 through the oblong apertures or slots in abutting end flanges of the sections, and when the complete armor has been placed around the tire, the abutting ends of the last two sections are preferably joined by bolts 15 through the oblong slots of such two abutting sections, although the loose connections may be employed at all joints between the sections.

The provision of the oblong slots, and the rings to connect two adjoining sections together provides for movement of one section without damaging the connection which joins it to the adjacent section, the slot and ring connection affording a considerable range of movement of the sections independently of each other, without danger of shearing the connecting rings. The projections on the sections besides serving to prevent skidding of the wheel, also afford means for giving a greater traction thereto as will be obvious, and while we have described in detail a preferable embodiment of our invention, it will be evident that in the practice thereof, various slight changes may be made in the details thereof, without departing from the spirit and scope of the invention as herein described and claimed.

Having fully described our invention, what we claim as new and desire to secure by Letters Patent of the United States is:—

A tire armor comprising a plurality of segmental sections of equal length, fitting together end-to-end to cover the entire periphery of the tire, and having projections on their outer faces, each of said sections being curved both longitudinally and transversely, and provided at each end with an outwardly projecting flange, the flanges of one plate abutting those of adjacent plates, and each formed with an elongated slot, the slots of abutting flanges registering, rings extending through said slots to flexibly connect the flanges, and each section having a pair of inwardly extending arms embracing the wheel felly on opposite sides at a point midway between the flanges on the section, and crossbolts extending transversely of the inner face of the felly, connecting said arms.

In testimony whereof we affix our signatures in presence of two witnesses.

EUGENE JENŐI.
STEVE KRUCHIÓ.

Witnesses:
E. V. VARGYAS,
GUSSIE NOTES.